Dec. 14, 1954 P. W. GARBO 2,696,718
USE OF THERMOPHORE PELLETS IN AIR RECTIFICATION
Filed Feb. 20, 1947 3 Sheets-Sheet 1

INVENTOR.
Paul W. Garbo
BY
Benjamin Sweedler
ATTORNEY

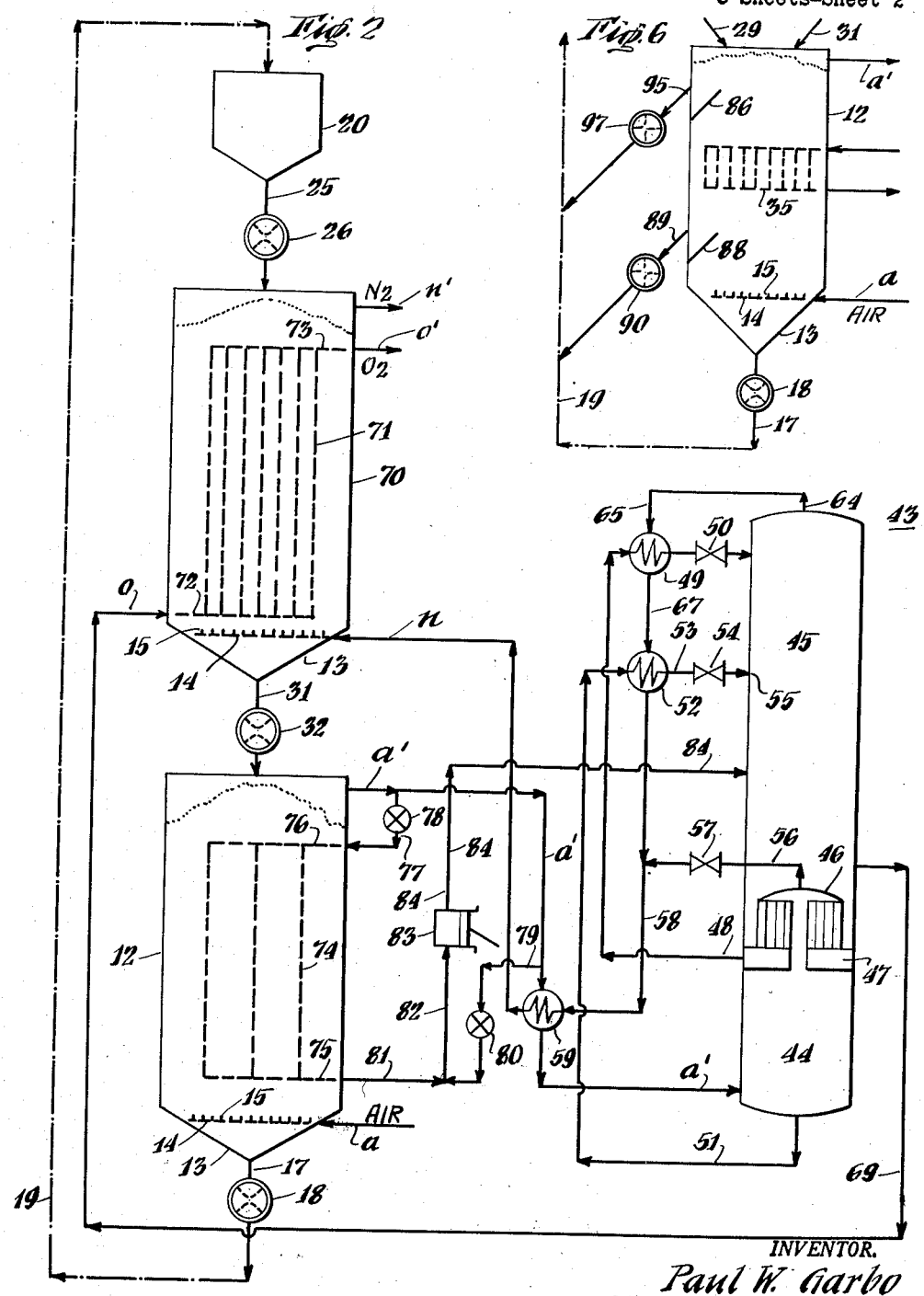

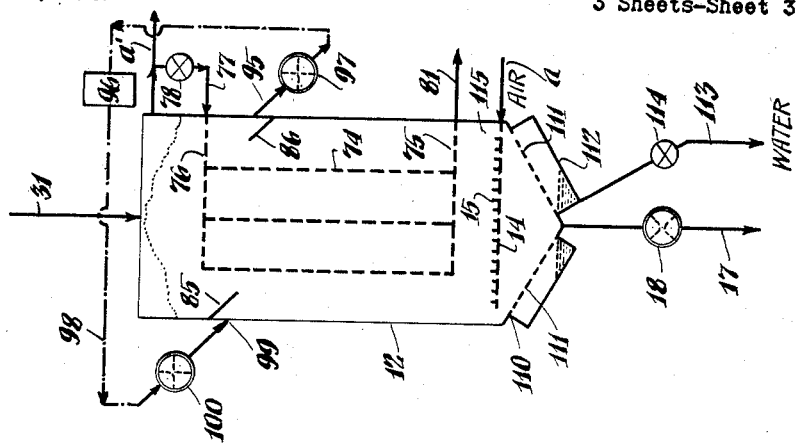
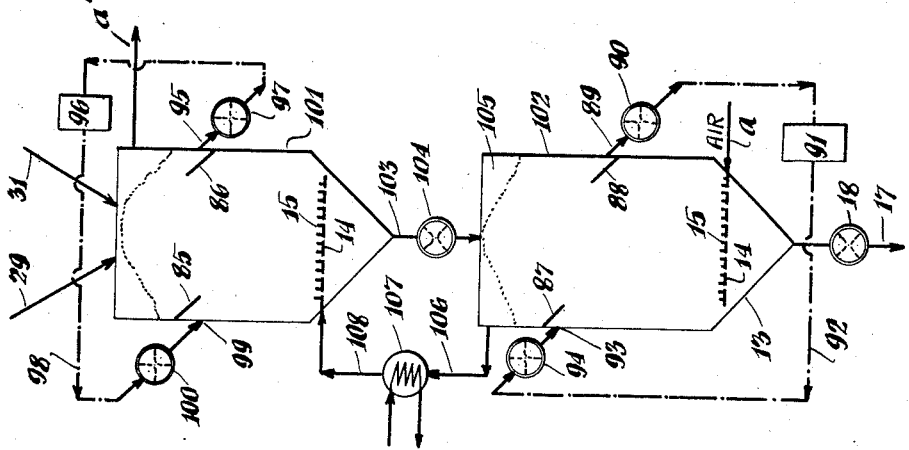
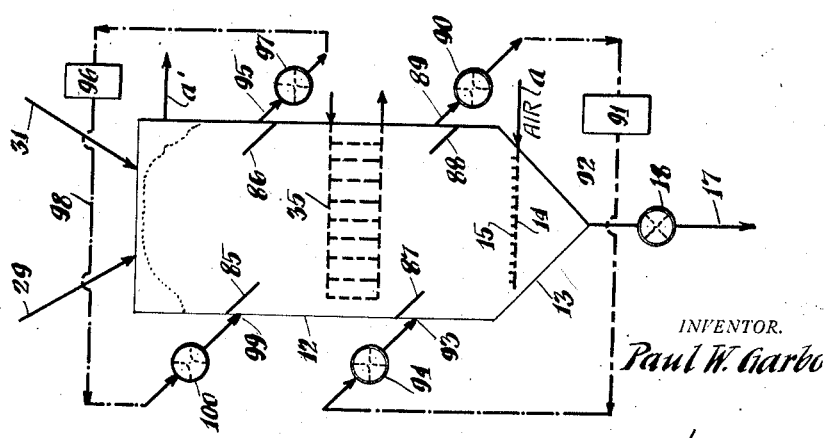

United States Patent Office

2,696,718
Patented Dec. 14, 1954

2,696,718

USE OF THERMOPHORE PELLETS IN AIR RECTIFICATION

Paul W. Garbo, Freeport, N. Y., assignor to Hydrocarbon Research, Inc., New York, N. Y., a corporation of New Jersey Application February 20, 1947, Serial No. 729,756

12 Claims. (Cl. 62—175.5)

This invention relates to the production of oxygen by the liquefaction and rectification of air.

All temperatures herein are in degrees F. and pressures in pounds per square inch gauge.

Oxygen is commonly produced by liquefaction of air and rectification at low temperatures; preferably rectification is conducted in two stages at different pressures. The refrigeration necessary for liquefaction is supplied to the air after it has been compressed and water cooled to approximately room temperature, by indirect heat exchange with the effluent products of rectification. An additional amount of refrigeration is supplied to compensate for cold losses resulting from the difference in enthalpy between the incoming air and the outgoing products of rectification and for heat leaks into the system. For economical operation it is essential to recover the cold content of the outgoing products of rectification. This is usually accomplished by passing these products in heat transfer relationship with the incoming air.

In older systems in order to avoid deposition of frost and solid carbon dioxide in the tubular countercurrent heat exchangers through which the air is passed in indirect heat exchange relation with the outgoing products of rectification, the air which invariably contains about .03% by volume of carbon dioxide and varying quantities of moisture is treated in driers and caustic scrubbers to remove the water and carbon dioxide prior to admittance of the air into the heat exchangers. Even with this treatment the exchangers had to be thawed out regularly to remove the frost (which term is used in a generic sense to include both snow and ice) which, unless removed, caused stopping up of the apparatus.

It has also been suggested to use cold accumulators or regenerators (hereinafter referred to as heat exchangers) of large cold absorbing capacity through which the warm incoming air and the cold products of rectification are alternately passed with periodically reversed operation so that streams of warm air are flowed through the same packing-filled spaces that the cold separated oxygen and nitrogen traversed during the previous step in the process, the impurities, such as carbon dioxide, deposited in these spaces during the passage of air therethrough being removed by sublimation during the subsequent flow in a reverse direction of the products of rectification. The use of these reversing heat exchangers in a process in which the air is compressed to relatively high pressure results in more costly operation from the standpoint of horsepower requirements because upon every reversal, which may take place every three minutes, the volume of compressed air in the heat exchangers is lost and must be again replaced. Moreover, in the operation of such reversing heat exchangers it is important not to let the temperature at the exit end of the exchangers drop to a point where a part of the air becomes liquid because this liquid adheres to the surface of the exchangers and is wasted upon reversal of flow. On the other hand the temperature conditions under which the exchangers are operated should be such as to obtain complete purging of the carbon dioxide deposited therein upon reversal of flow which usually requires having the air exit end of at least one of the exchangers at a low temperature, i. e., at or near the dew point of air.

Recently it has been suggested to use cold exchangers involving passages of relatively small cross sectional area, which passages are provided with closely spaced fins of foil-like metal of high heat conductivity to provide an exceptionally high surface area of cold exchanger surface per unit of volume of exchanger space through which passages flow in indirect heat exchange relationship with the air and the oxygen and nitrogen products of rectification. Periodically the flow of the air and the nitrogen is reversed, i. e., switched, through their respective passages so that the nitrogen flows through the passages through which had passed the air and the air flows through the passages through which had passed the nitrogen during the preceding step of the process. Operating in this manner the nitrogen stream removes by sublimation the carbon dioxide and frost deposited during the preceding step of the process so that complete purging of carbon dioxide and frost is obtained on each reversal of flow.

It is an object of the present invention to provide a process for producing oxygen by the liquefaction and rectification of air which process provides for more efficient transfer of cold from the outgoing nitrogen or oxygen or both nitrogen and oxygen products of rectification to the incoming air stream than prior known procedures.

Another object is to provide such process for producing oxygen in a preferred embodiment of which the air stream need not be subjected to a preliminary purification treatment to effect the removal of condensible constituents such as moisture and carbon dioxide but purging of these condensible constituents from the system is accomplished so as to permit continuous operation of the equipment in which the process is carried out.

Other objects and advantages of this invention will be apparent from the following detailed description thereof.

In accordance with this invention a mass of thermophore pellets is passed downwardly in one zone countercurrent to an upwardly flowing stream of a rectification product introduced into this zone, the rectification product being substantially uniformly distributed throughout the mass and flowing upwardly therethrough. Due to the unusually large surface area of heat exchange surface provided by the pellets the cold transfer between the rectification product and the pellets is exceptionally efficient; the temperature approach between the incoming rectification product and the exiting thermophore pellets may be made as low as 3° F., or even less. The thus chilled thermophore pellets are then passed downwardly in a second zone countercurrent to a stream of air introduced into the base portion of the mass of pellets passing through the second zone and substantially uniformly distributed therethroughout, the air flowing upwardly through the mass of pellets and being withdrawn from the top portion thereof thereby removing from the thermophore pellets the cold imparted thereto by the rectification product in the preceding step of the process.

When operating with an air exchanger not provided with means for effecting purging of the pellets to remove therefrom condensible constituents or constituents deposited thereon from the air stream, the air should be treated for removal of condensible constituents, such as moisture and carbon dioxide, to avoid such deposition of frost and solid carbon dioxide on the pellets in the second zone as would interfere with the continuous free flow of the air up through the pellets in the second zone in efficient cold exchange relation with the pellets. Any known treatment for removing moisture and carbon dioxide may be used for this purpose, for example, the air may be scrubbed with caustic soda or other chemicals to remove the carbon dioxide. Preferably, however, the air exchanger is provided at one or more spaced points along the path of flow of the pellets with withdrawal means for effecting removal of a portion of the pellets containing a condensible constituent or constituents removed from the air stream, the pellets thus removed are purged and the thus purged pellets reintroduced into the exchanger system of moving pellets thereby preventing the building-up of condensible constituents in the second zone to an extent that the constituents would interfere with the free flow of the air upwardly therethrough and in efficient cold exchange relationship with the descending pellets.

In the preferred embodiment of the invention a stream of nitrogen product of rectification at a temperature close to that at which it leaves the rectification system and a pressure of from about 2 to about 10 lbs. is passed upwardly uniformly distributed throughout a down-flowing mass of thermophore pellets which are withdrawn from this zone at a temperature approaching that, say within 3° F., of the incoming nitrogen stream. The oxygen product of rectification may be passed through the same exchanger in cold exchange relationship with the thermophore pellets passing downwardly countercurrent to the nitrogen or through a separate exchanger from that through which the nitrogen passes but in any event the cold content of the oxygen as well as that of the nitrogen is recovered.

The thus chilled thermophore pellets are passed downwardly in a second zone countercurrent to a rising stream of air introduced into the base portion of said zone at a pressure of from about 60 to about 100 lbs. and usually at an initial temperature of from about 70° to about 110° F. In the region of the upper portion of the mass of thermophore pellets through which the air passes, where condensation of carbon dioxide takes place, a portion of the pellets is withdrawn, treated to effect removal of carbon dioxide and reintroduced into the exchanger system at any desired point, usually in the second zone near the point thereof from which it is withdrawn, thereby avoiding accumulation of carbon dioxide in the upper portion of this zone. Generally, the pellets to be purged of carbon dioxide are withdrawn from the second zone at a point where the temperature is from about −200° to about −240° F. At a lower point in this zone where the temperature may be in the neighborhood of from about 30° to about −10° F., a portion of the thermophore pellets is again withdrawn, treated to effect removal of frost and reintroduced into the exchanger system, say at the lower portion of the zone near the point from which it was withdrawn, to avoid accumulation of frost in the lower portion of the zone, such as would interfere with the free flow of the air through the thermophore pellets. The air leaves the second zone at a temperature approaching, say within 3° F., of that of the incoming thermophore pellets and at a pressure slightly less than that at which it is introduced into the second zone. The thermophore pellets are maintained under the same pressure conditions as the air stream in their flow as a continuously moving permeable mass or bed countercurrent to the rising air stream.

By "thermophore pellets" is meant a finely divided solid material of high heat absorbing and heat transfer capacity. Copper, aluminum and other metals and alloys of high heat absorbing and transfer capacity will be found suitable. The term "pellets" is used in a broad sense and is intended to mean small particles, preferably but not necessarily of spherical or near spherical shape, of at least sufficient mass to form a dense permeable bed or mass capable of moving downwardly against a rising gaseous stream. The smaller the size of the pellets the greater the surface area provided by a bed of such pellets per unit volume of exchanger. However, the use of pellets so small that they tend to pack or cause a large pressure drop in the gas stream flowing through the bed should be avoided. The optimum particle size for any operation is readily determinable by simple preliminary experiments conducted under conditions simulating those of actual operation. In general, it is advisable to employ fairly uniform-sized particles not smaller than, say 40 mesh. Copper or aluminum shot or beads (spherical particles) having an average diameter of from about $1/16$ to $3/16$ inch will be found desirable.

In the accompanying drawings forming part of this specification and showing for purposes of exemplification preferred forms of apparatus for practising this invention:

Fig. 1 is a schematic vertical section through an apparatus for producing oxygen by the process of this invention. This figure shows two separate exchangers for the flow of oxygen and nitrogen products of rectification through two continuously moving permeable beds of thermophore pellets and a single exchanger for flow of air therethrough in cold exchange relation with the thermophore pellets;

Fig. 2 is a schematic vertical section through a modified arrangement of apparatus for producing oxygen by the process of this invention, in which arrangement one exchanger is employed for flow of oxygen and nitrogen products of rectification in cold exchange relationship with a continuously moving permeable bed of thermophore pellets and a second for flow of the air stream in cold exchange relationship with a second continuously moving bed of thermophore pellets; this figure also discloses an alternate method, as compared with that shown in Fig. 1, for supplying the refrigeration necessary to compensate for cold losses resulting from the difference in enthalpy between the incoming air and the outgoing products of rectification and for heat leaks into the system;

Fig. 3 is a vertical section through the air exchanger of Fig. 1 but equipped to provide for purging of the thermophore pellets to effect the removal therefrom of condensed moisture and carbon dioxide deposited thereon from the air stream.

Fig. 4 is a vertical section through an air exchanger involving a pair of chambers for flow of the air stream in cold exchange relationship with two continuously moving beds of thermophore pellets, which type of exchanger may be substituted for the type shown in Fig. 1 or Fig. 2;

Figure 1:
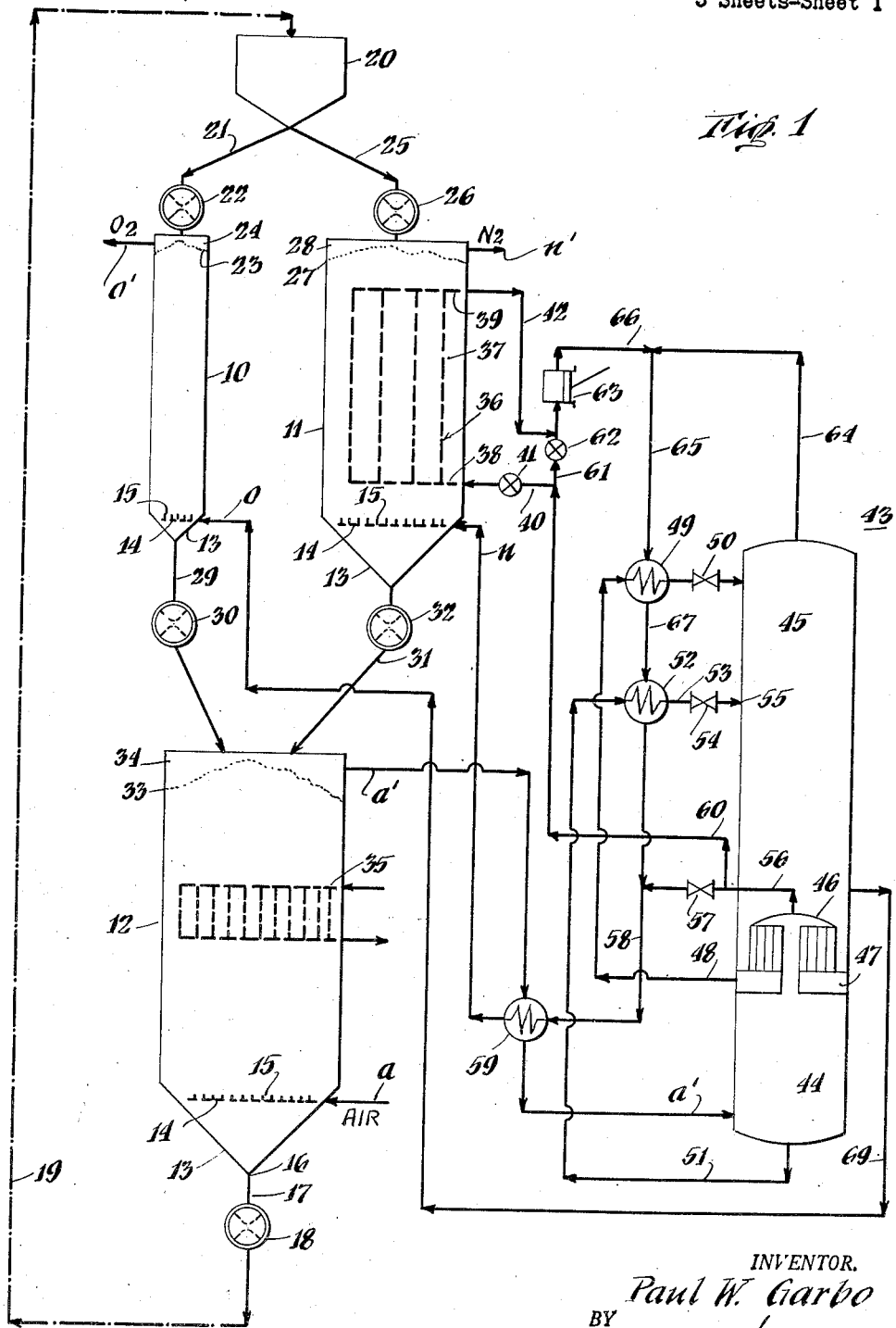

Fig. 5 is a vertical section through a modified form of air exchanger of the general type shown in Fig. 2 but equipped to effect purging of moisture as liquid without removing the thermophore pellets from the bed, and purging of the carbon dioxide by removing a portion of the thermophore pellets containing condensed carbon dioxide from the upper portion of the bed, purging these pellets to remove the carbon dioxide and reintroducing them into the bed near the point from which they were withdrawn; and Fig. 6 is a diagrammatic view showing an alternative arrangement for purging the thermophore pellets; in this modification, the pellets are purged of condensible constituents within the exchanger system whereas in the modifications of Figs. 3, 4 and 5 the purging of condensible constituents is effected exteriorly of the exchangers.

In the modification of Fig. 1, three exchangers, 10, 11 and 12 are employed. Oxygen product of rectification flows through exchanger 10, nitrogen product of rectification through exchanger 11 which, it will be noted from the drawing, has approximately four times the volumetric capacity of exchanger 10 and air through exchanger 12. Each of these exchangers comprises a conical base portion 13 having disposed in the vicinity of the conical base portion a distributor 14 equipped with outlets or nipples 15 for distributing the gaseous medium uniformly throughout the entire cross-sectional area of the bed of pellets within the cylindrical body portion of the exchanger. Of course the exchangers need not be cylindrical in cross section but may be of any desired polygonal or other shape.

Oxygen exchanger 10 is provided with an oxygen inlet pipe $o$ and an oxygen exit pipe $o'$. The nitrogen exchanger 11 is provided with a nitrogen inlet line $n$ and a nitrogen exit line $n'$. The air exchanger 12 is provided with an air inlet line $a$ and an air exit line $a'$. Leading from the apex 16 of the conical base 13 of air exchanger 12 is a line 17 for flow of thermophore pellets from the air exchanger. Flow through line 17 is controlled by rotary valve 18; line 17 communicates through 19, which may be a screw conveyer, bucket elevator or other known type of pellet moving and elevating mechanism, with a hopper 20. The pellets are introduced into exchanger 10 from hopper 20 by way of discharge line 21, flow through which is controlled by a rotary valve 22, line 21 entering the top portion of exchanger 10. The thermophore pellets are thus introduced into the top portion of exchanger 10 at a rate to provide a continuously moving bed extending from the apex of the conical base 13 to heaping top 23, leaving a small free space 24 at the top of the exchanger. In like manner, thermophore pellets are supplied from hopper 20 through line 25 having rotary valve 26 therein into nitrogen exchanger 11, forming a bed of pellets extending from the apex of the conical base 13 to the heaping top indicated by 27, leaving the free space 28. The free spaces 24 and 28 form gas collecting spaces; the oxygen exit line $o'$ leads from space 24 and the nitrogen exit line $n'$ from space 28.

A line 29 leads from the conical base of oxygen exchanger 10 and has therein a rotary valve 30 for regulating the flow of thermophore pellets from exchanger 10 and into the top of air exchanger 12. Line 31 leads from the conical base of nitrogen exchanger 11 and has therein a rotary valve 32 for controlling the flow of pellets from exchanger 11 and into the top of air exchanger 12. Thermophore pellets thus introduced from the oxygen and nitrogen exchangers 10 and 11, respectively, into the air exchanger 12 form a continuously moving permeable bed extending from the apex of the conical base of air exchanger 12 to heaping top 33, leaving free space 34 at the top of this exchanger. This free space functions as a gas collecting header from which leads the air exit pipe a'.

Thus by properly positioning rotary valves 22, 26, 30, 32 and 18 a continuously moving permeable bed of thermophore pellets is introduced into each exchanger and moves downwardly therethrough at a constant rate while the gaseous medium flows upwardly therethrough in surface contact with the pellets. Furthermore due to the restricted flow path formed by lines 29 and 31 having valves 30 and 32 therein, there is substantially greater resistance to gas flow through these lines than there is to flow of the gas upwardly through exchanger 12. Hence, little or none of the air flows from exchanger 12 into exchangers 10 and 11.

The length and cross-sectional area of the exchangers 10, 11 and 12 will depend, among other factors, upon the desired volumetric capacity of any given installation; the length however should be such that sufficient time of contact between the gaseous medium flowing therethrough and the thermophore pellets is provided so that the thermophore pellets leave the exchanger at a temperature close to that, preferably within 3° F., of the incoming gaseous stream.

Disposed within air exchanger 12 is a coil or bank of tubes 35 which coil is embedded in the bed of thermophore pellets, as shown in the drawing. This coil is for the purpose of introducing external refrigeration into the system to compensate for cold losses resulting from the difference in enthalpy between the incoming air and the outgoing products of rectification and for heat leaks into the system. For this purpose a refrigerant, such as ethylene or carbon tetrafluoride may be passed through coil 35. Alternatively a minor portion of the compressed air, say about 7%, may be expanded to lower its temperature and the thus cooled air passed through the coil 35.

A bank of tubes 36 is disposed in contact with the pellets in the nitrogen exchanger 11 and consists of vertical tubes 37 connected at their base by a header 38 and at their top by a header 39. Flow into header 38 takes place through a line 40 having a valve 41 therein. Header 39 communicates with an exit line 42.

The rectification system comprises, for example, a two-stage rectification column 43, the lower section 44 of which is operated at a pressure of about 72 lbs. and the upper section 45 of which is operated at a pressure of from about 2 to about 10 lbs., preferably at about 5 lbs. This rectification column, as is customary, is provided with rectification plates of the bubble cap or other desired type.

The lower section 44 communicates with a condenser 46 and has a liquid collecting shelf 47 disposed immediately below condenser 46 for collecting liquid nitrogen. Pipe 48 leads from this shelf 47 to a heat exchanger 49 which in turn communicates through a pressure reducing valve 50 with the upper section 45. Condenser 46 acts as a reboiler for the upper section 45 of the column 43. From the base of the lower section 44 a pipe line 51 for the flow of crude oxygen (containing approximately 40% oxygen) passes to a heat exchanger 52 which communicates through pipe line 53 having a pressure reducing valve 54 therein with the low pressure section 45 at an intermediate point 55.

A line 56 having a pressure reducing valve 57 therein leads from condenser 46 to a nitrogen line 58 communicating by way of heat exchanger 59 with the inlet *n* to nitrogen exchanger 11. Line 56 is provided with a branch line 60 leading to line 40 entering the tube bank 36 in exchanger 11. This branch line 60 also communicates with a line 61 having a valve 62 therein; line 61 leads into an expander 63 of any well known type. A line 64 leads from the top of low pressure section 45 into line 65 into which also leads line 66 from expander 63. Line 65 extends into the heat exchanger 49; the nitrogen flowing through heat exchanger 49 passes through line 67 and heat exchanger 52 into line 58. Oxygen line 69 leads from the lower part of the low pressure section 45 to the inlet line *o* in oxygen exchanger 10.

The heat exchangers 49, 52, and 59 and the two-stage fractionating column 43 may be of any conventional type. Two separate fractionating columns suitably interconnected may be used in place of the two-stage column 43 shown. It will be understood that the equipment throughout, including exchangers 10, 11 and 12 and all piping connections are heat insulated to minimize loss of cold.

The parts of Fig. 2 similar to those of Fig. 1 have been given like reference numerals and it is believed the structure and functions of these parts will be evident from the above description thereof taken in connection with Fig. 1. The apparatus of Fig. 2 differs from that of Fig. 1 chiefly in two respects, namely, (1) A single exchanger 70 for recovering the cold content of the outgoing nitrogen and oxygen products of rectification is employed in lieu of the two exchangers 10 and 11.

(2) The apparatus of Fig. 2 involves a different procedure for compensating for cold losses due to the difference in enthalpy between the incoming air and the outgoing products of rectification and for heat leaks into the system.

In the apparatus of Fig. 2, exchanger 70 is provided with a bank of vertical tubes 71 extending substantially the full length of the bed of thermophore pellets and embedded therein so that the thermophore pellets flow freely about the outer surface of these tubes in indirect heat exchange relationship with the oxygen flowing through these tubes. Tubes 71 communicate with a lower header 72 communicably connected with the oxygen inlet line *o* and with an upper header 73 communicably connected with oxygen exit line *o'*.

The air exchanger 12 may be similar in construction to that of Fig. 1 except that instead of the coil 35 it has disposed in the bed of thermophore pellets a bank of vertical tubes 74 connected to a base header 75 and a top header 76. A line 77 having a valve 78 therein leads from the air line *a'* for flow of a minor portion, say about 2% by volume of the cold air leaving through line *a'*, through header 76, tubes 74 and header 75. A branch line 79 with valve 80 leads from line *a'* for flow therethrough of another minor portion, say about 18% of the cold air discharging from exchanger 12. The air flowing through line 79 and line 81 communicating with base header 75 enters a common line 82 leading into expander 83 of any well known type, from which a line 84 leads into the low pressure stage 45 of the rectification column 43. Instead of dividing the air to be expanded in expander 83 into two portions, one of which passes through tubes 74 in exchanger 12 and the other passes through line 79, all of the air to be expanded may be passed through heat exchange tubes similar to tubes 74 to heat the air to the desired temperature for introduction into expander 83 and the thus warmed air may then be expanded to produce the refrigeration required to compensate for cold losses due to the difference in enthalpy between the incoming air and the outgoing products of rectification and for heat leaks into the system.

In the modification of Fig. 2, the rectification column 43 is not provided with equipment corresponding to expander 63 and the tube bank 36 and piping associated therewith, employed to effect purging of incondensible gases, such as hydrogen, helium and neon, from the high pressure stage of column 43 by expanding a minor portion of the total nitrogen introduced into the process and containing such incondensible gases from the high pressure stage to cool this nitrogen, imparting the cold thus produced to the rectification products entering the low pressure stage, preferably also to the air entering the high pressure stage, then passing this nitrogen mixed with nitrogen from the low pressure stage up through a downwardly flowing permeable bed of thermophore pellets to recover the cold content of the nitrogen and thereafter passing the nitrogen through exit line *n'* thus purging the incondensible gases from the process. It will be understood that, if desired, such purge system may be employed in the apparatus of Fig. 2 or it may be omitted from that of Fig. 1.

It is desirable that air which has been subjected to preliminary purification treatment to effect the removal of condensible constituents, such as moisture and carbon dioxide, be employed in the operation of the apparatus of Figs. 1 and 2 herein above described.

The modifications of Figs. 3, 4 and 5 disclose air exchangers equipped to effect purging of the thermophore pellets to prevent the build-up of condensed moisture and carbon dioxide to the point where the free flow of air through the continuously moving permeable bed of pellets is impaired so that efficient cold transfer between the pellets and the air stream is not obtained. These modifications, therefore, are particularly adapted for use with air which has not been subjected to preliminary purification treatment. In these modifications the parts thereof which correspond with parts shown in Figs. 1 and 2 have been given like reference characters.

The air exchanger of Fig. 3, in general, is similar to that of Fig. 1, except that it is provided with a pair of baffles 85 and 86 at opposite sides of its upper portion, and a second pair of baffles 87 and 88 at opposite sides of its lower portion. These baffles extend in the locality where the pellets are withdrawn from and introduced into the air exchanger 12 and facilitate such withdrawal and introduction. Pellet exit line 89 is disposed just above baffle 88 where the temperature of the pellets may be in the neighborhood of about 30° to —10° F. Flow through this line is controlled by rotary valve 90. Line 89 communicates with a purge chamber 91 from which leads a line 92 into the exchanger 12 at a point 93 just below baffle 87. A rotary valve 94 is used in returning pellets to exchanger 12; valves 90 and 94 permit withdrawal of a portion of the thermophore pellets containing condensed moisture and their reintroduction after purging in chamber 91 without disturbing the pressure conditions in exchanger 12.

A pellet exit line 95 leads from the portion of exchanger 12 just above baffle 86 into a purge chamber 96. At baffle 86, the temperature of the pellets is within the range in which carbon dioxide is deposited thereon, say about —200° to about —240° F. Flow through this line 95 is controlled by rotary valve 97. A line 98 leads from chamber 96 to point 99 just below baffle 85. A rotary valve 100 is employed for reintroducing the purged pellets into exchanger 12.

In the modification of Fig. 4, instead of employing an air exchanger consisting of one chamber as in Figs. 1, 2 and 3, an air exchanger consisting of two chambers 101 and 102 is used through each of which chambers passes a continuously moving bed of thermophore pellets; it will be understood, the air exchanger of Fig. 4 may be substituted for that of Fig. 1 or 3. Lower chamber 102 is provided with an air inlet line a, the air flowing upwardly through the down-flowing thermophore pellets which enter chamber 102 through a line 103 having a rotary valve 104 therein for controlling flow therethrough. Leading fom the collecting space 105 at the top of chamber 102 is a line 106 which passes through a refrigeration system 107 supplied with ethylene, carbon tetrafluoride or other suitable refrigerant. A line 108 leads from this refrigeration system into the air distributor 14 for uniformly distributing the air throughout the base portion of the continuously moving permeable bed of thermophore pellets flowing through chamber 101.

In the modification of Fig. 4, the air stream at a temperature such that it is completely free of moisture, which has been deposited on the pellets, leaves the lower chamber 102 through line 106 and is refrigerated by passing through the refrigeration system 107; an amount of cold is thus introduced into the air stream adequate to compensate for cold losses due to the difference in enthalpy between the incoming air and the outgoing products of rectification and for heat leaks into the system. In the continued flow of the air through chamber 101 countercurrent to the descending bed of thermophore pellets, carbon dioxide is removed from the air stream by deposition on the pellets in chamber 101.

Lower chamber 102 has a purge system for effecting purging of moisture condensed on the pellets passing downwardly through this chamber, which purge system in general is the same as that associated with the base portion of chamber 12 in Fig. 3 and has been given like reference characters. Likewise, a carbon dioxide purging system is associated with chamber 101, which in general is the same as the carbon dioxide purging system associated with the top portion of exchanger 12 in Fig. 3 and has been given like reference characters. In the operation of these purge systems, a portion of the thermophore pellets is periodically or continuously withdrawn through line 95 the inlet of which is positioned just above baffle 86 where the temperature of the pellets may be within the range of from about —200° to about —240° F., is passed through chamber 96 where purging of the carbon dioxide is effected and is returned to chamber 101 at 99 through valve 100. A portion of the thermophore pellets is also withdrawn from above baffle 88 in chamber 102 at a temperature of about 30° to about —10° F., is introduced into chamber 91 where the frost is removed therefrom and is returned to chamber 102 at 93 through valve 94.

The exchanger of Fig. 5 differs from that of Fig. 2 chiefly in that the conical base 110 is provided with perforations 111 of a size smaller than the thermophore pellets so that few, if any, pellets pass through these perforations. A water-collecting jacket 112 is secured to base 110 for collecting water draining from the pellets through the perforations 111. The water thus collected may be removed through line 113, flow through which is controlled by a valve 114.

In the operation of the exchanger of Fig. 5, the temperature of the air as it flows up through the downwardly continuously moving bed of thermophore pellets gradually decreases; hence moisture contained in the air is deposited as dew and frost on the pellets. The temperature of the pellets, on the other hand, moving downwardly gradually increases so that as the pellets approach the point where the air enters the exchanger the frost thereon is melted and the water draining from the pellets passes downwardly to the conical base 110 of exchanger 12 exiting through perforations 111 and collecting in jacket 112 from which the water may be withdrawn through pipe 113 by opening valve 114 whenever desired. The carbon dioxide in the air condenses out and deposits on the pellets in the upper portion of the bed where the temperature is below about —200° F. The deposited carbon dioxide is purged by passage of a portion of the pellets through line 95 and valve 97 into purge chamber 96 from which the purged pellets are returned through line 98 and valve 100 to air exchanger 12 at point 99.

Purging of the thermophore pellets to effect removal of moisture in chamber 91 and of carbon dioxide in chamber 96 may be accomplished by decreasing the pressure on the pellets in these chambers, say to a pressure of about 5 pounds or to atmospheric pressure, to cause the moisture and carbon dioxide, respectively, to flash off, by heating the thermophore pellets to drive off moisture and carbon dioxide, respectively, by passing a gas, for example, effluent nitrogen, from line n' in contact with the thermophore pellets passing through these chambers to remove the moisture and carbon dioxide, respectively, or in any other manner which would be apparent to one skilled in the art. The evaporation of the carbon dioxide and moisture from the thermophore pellets by reducing the pressure and flashing off these condensible constituents results in a chilling of the thermophore pellets thereby reducing the amount of refrigeration introduced into the process, for example, by refrigerating coil 35 (Fig. 1) and thus effecting a saving in the operation of the process. Such conservation of refrigeration is readily obtained by transferring from the air exchanger pellets containing a condensed constituent to a rectification product exchanger wherein the gaseous stream of rectification product will flow in contact with the pellets and evaporate the condensed constitutent therefrom; the vaporized condensible constituent is swept out of the exchanger system by the gaseous stream of rectification product.

Where the pressure on the thermophore pellets has been reduced or the temperature thereof increased, the pressure may be restored and the pellets chilled to restore the cold content thereof before they are reintroduced into the air exchanger. If desired, the thermophore pellets withdrawn from the air exchanger, after purging, may be chilled to a point such that they introduce into the process the refrigeration necessary to compensate for cold losses due to the difference in enthalpy between the incoming air and the outgoing products of rectification and for heat leaks into the system and the thus chilled thermophore pellets reintroduced into the air exchanger. Operating in this manner, the coil 35 of Fig. 3 or 107 of Fig. 4 may be eliminated.

Instead of purging the thermophore pellets in separate chambers 91 and 96, as shown in Fig. 3 for example, the thermophore pellets may be purged within the exchanger system as shown in Fig. 6. This figure shows diagrammatically equipment of the type shown in Fig. 3; like parts in Figs. 3 and 6 are indicated by the same reference characters. Referring to Fig. 6, the stream of thermophore pellets passing through line 89 and rotary valve 90 containing frost and the stream of thermophore pellets passing through line 95 and rotary valve 97 containing carbon dioxide discharge into the conveyor line 19 which carries the thermophore pellets issuing from exchanger 12 by way of line 17 and rotary valve 18 to hopper 20 (Fig. 1) whence the pellets are fed to exchangers 10 and 11. Any condensed constituents not eliminated from the thermophore pellets while in transit to exchangers 10 and 11 are purged by the upward flow of oxygen and nitrogen in exchangers 10 and 11, respectively. It will be observed that the thermophore pellets thus withdrawn through lines 89 and 95 to avoid accumulation of condensible constituents in exchanger 12 are returned to this exchanger after flowing through exchangers 10 and 11 and lines 29 and 31. This method of reintroducing pellets into the system of circulating thermophore pellets after they have been withdrawn from the air exchanger for purging condensed constituents such as moisture and carbon dioxide therefrom, may be used in operations where a single exchanger is used for cold transfer between the products of rectification and the thermophore pellets as shown in Fig. 2 and in operations where two or more exchangers are used for cold transfer between the pellets and the air stream as shown in Fig. 4.

This invention comprehends the withdrawal of thermophore pellets containing condensible constituents from the air exchanger and return thereof at any desired point in the entire exchanger system. The withdrawn pellets may be purged of condensed constituents outside of the exchanger system, as in chambers 91 and 19 of Fig. 3, or within the exchanger system as shown in Fig. 6. Where the thermophore pellets are purged within the exchanger system, it is desirable in the interests of conserving refrigeration to convey as separate streams the pellets containing carbon dioxide to the lower or colder portion of a rectification porduct exchanger, say the nitrogen exchanger 11, and the pellets containing frost to the upper or warmer portion of a rectification product exchanger, say the nitrogen exchanger 11.

The rotary valves 22, 26, 30, 32 and 18 of Fig. 1 and the rotary valves of Figs. 2 to 6, it will be understood, represent one type of mechanism for permitting withdrawal of thermophore pellets from or introduction thereof into the respective units of the apparatus without seriously interfering with the desired pressure conditions therein. Instead of rotary valves, slide valves or other such mechanisms may be employed.

*Example 1*

The following example is illustrative of the operation of the process of this invention to produce oxygen in the equipment of Fig. 1 employing copper shot having an average diameter of ⅛ inch as the thermophore pellets. It is to be understood the invention is not limited to this example.

Air under pressure of about 75 lbs. and a temperature of about 100° F. is supplied to exchanger 12 through line *a*. Cold pellets are introduced into the top of exchanger 12 at a temperature of about —280° F. and leave through line 17 at a temperature of about 97° F. The temperature of the air gradually decreases as it flows up through the thermophore pellets, the air leaving through line *a'* at a temperature of —275° F. at which temperature it flows through heat exchanger 59 in heat exchange relation with nitrogen and enters high pressure section 44 at a temperature of —278° F. and a pressure of 72 lbs.

Crude oxygen at a temperature of —280° F. and a pressure of 72 lbs. leaves the base of section 44, flows through heat exchanger 52 where its temperature is reduced to —289° F. and upon flow through the pressure reducing valve 54 is flashed, entering low pressure section 45 at a temperature of from about —310° to about —315° F. and a pressure of 5 lbs. Pure oxygen is withdrawn through line 69 at a temperature of —292.5° F. and a pressure of 5 lbs. and flows through exchanger 10 countercurrent to the continuously moving bed of thermophore pellets entering through line 21, the oxygen exiting from exchanger 10 at a temperature of about 95° F. and a pressure of 1 lb.

Nitrogen at a temperature of about —286.5° F. and a pressure of 72 lbs. in amount equal to 12½% by volume of the total nitrogen introduced into the process is withdrawn through line 56. The nitrogen flowing through line 56 may be passed either through line 60 by closing valve 57, or by closing valves 41 and 62 and opening valve 57 it may be expanded and passed through line 58 directly to exchanger 59 and thence to the inlet line *n* of the nitrogen exchanger 11. Preferably, this nitrogen is passed through line 60, valve 57 being closed, and of the nitrogen flowing through this line about 10% passes through line 40 and vertical tubes 37, its temperature being thereby invreased to —83° F. The remaining 90% of the nitrogen flows through valve 62 in line 61 and is mixed with the other 10% nitrogen before entering expander 63, the temperature of the mixture being about —273° F. The nitrogen stream at this temperature enters expander 63 and leaves at a temperature of —315° F. and a pressure of 5 lbs. By preheating a portion of the nitrogen before expansion of the mixture, the temperature of the mixture is increased to the point where no liquid nitrogen is formed within the expander with consequent improvement in the efficiency of the operation of the expander. In lieu of dividing the nitrogen stream and passing one portion through tubes 37 and the other portion through line 61, valve 62 and thence into expander 63, the entire stream of nitrogen to be expanded may be passed through tubes 37 to be preheated to the desired temperature and then introduced into the expander 63 at this temperature. The expanded nitrogen flows through line 66 and mixes with nitrogen at a temperature of —315.5° F. and a pressure of 5 lbs. introduced from line 64 into line 65. The resultant nitrogen stream passes through exchanger 49 in indirect heat exchange relation with nitrogen employed as reflux in section 45, its temperature being thereby increased to —306° F. while the temperature of the nitrogen flowing through line 48 (pressure of 72 lbs.) into exchanger 49 is reduced to —300° F. This nitrogen by expansion through valve 50 has its pressure reduced to 5 lbs. and its temperature to —315.5° F. The effluent nitrogen passing through exchanger 49 then flows through line 67 and exchanger 52 where its temperature is increased to —293° F. The crude oxygen stream flowing through exchanger 52 is thereby cooled from a temperature of —280° F. to a temperature of —289° F. The nitrogen stream then flows through line 58 and exchanger 59 in heat exchange relationship with the air, the nitrogen stream temperature being thereby increased to —279° F. at which temperature and at a pressure of about 5 lbs. it enters line *n* and flows upwardly through the downwardly moving thermophore pellets in exchanger 11. The nitrogen leaves through line *n'* at a temperature of 95° F. and a pressure of about 1 lb.

The thermophore pellets passing from the exchanger 12 through line 17 at a temperature of about 97° F. are elevated into the hopper 20 from which they are distributed through lines 21 and 25 to the oxygen and nitrogen exchangers 10 and 11, the flow of the pellets into these exchangers being controlled by valves 22 and 26. These pellets flow as moving permeable beds downwardly through the exchangers 10 and 11, constituting the first zone of the process, countercurrent to the upwardly flowing streams of oxygen and nitrogen, respectively. The thermophore pellets leave exchangers 10 and 11 through lines 29 and 31 at temperatures approximating those of the gas streams entering these exchangers. The average temperature of the pellets entering air exchanger 12 is about —280° F.

*Example 2*

This example differs from Example 1 in that the air exchanger of Fig. 3 is used instead of that of Fig. 1. The temperature and pressure conditions in the rectification system and in the oxygen and nitrogen exchangers 10 and 11 are the same as in Example 1 and hence will not be repeated.

Air under a pressure of about 75 lbs. and a temperature of about 100° F. is supplied to exchanger 12 through line *a*. The temperature of the air as it flows upwardly through the downwardly moving permeable bed of pellets gradually decreases; at the level of baffle 88 the temperature of the air is about 25° F. and in the vicinity of coil 35 it decreases from about —135° to —140° F. In the further flow of the air, its temperature is decreased to about —275° F. at which point it leaves through line *a'*;

at the level of baffle 86, the temperature is about —210° F. Moisture is removed from the air in the form of frost before the air reaches coil 35 by deposition on the thermophore pellets passing downwardly through the lower portion of air exchanger 12. Carbon dioxide is removed in solidified form during the flow of the air through the portion of the exchanger above refrigerating coil 35, the carbon dioxide being deposited on the thermophore pellets in the upper portion of air exchanger 12.

A side stream of about 5% by weight of the total stream of thermophore pellets passing through exchanger 12 is periodically or continually removed through line 89 at a temperature of 25° F. and a pressure of about 75 lbs., passed through chamber 91 where the pellets are defrosted by heating and then returned through valve 94 in line 92 to exchanger 12 at 93 where the temperature and pressure are substantially the same as at the point from which the pellets were removed.

Another side stream of about 3% by weight of the total stream of thermophore pellets passing through exchanger 12 is periodically or continually removed through line 95 at a temperature of about —210° F. and pressure of about 75 lbs., passed into chamber 96 where the pellets are contacted with dry air having a temperature of about —150° F. to effect removal of carbon dioxide therefrom and then returned through valve 100 to exchanger 12 at 99 where the temperature and pressure are substantially the same as at the point from which the pellets were removed. Such removal of a portion of the thermophore pellets containing frost and carbon dioxide, the purging of the pellets thus withdrawn, and their reintroduction into the exchanger system prevents the build-up of condensible constituent or constituents to the point at which the solidified constituents would interfere with the free flow of air up through the thermophore pellets moving downwardly as a permeable bed through the air exchanger.

*Example 3*

The following example is illustrative of the operation of the process of this invention to produce oxygen in the equipment of Fig. 2 employing aluminum balls having an average diameter of $\frac{3}{16}$ inch as the thermophore pellets. It is to be understood this invention is not limited to this example.

Air at a pressure of about 75 lbs. and a temperature of 95° F. is admitted to exchanger 12 through line $a$ and passed upwardly through the downwardly moving permeable bed of pellets. The air leaves through line $a'$ at a temperature of about —276° F. The thermophore pellets enter at a temperature of about —283° F., flow downwardly as a permeable bed and leave through line 17 at a temperature of about 90° F. The thermophore pellets are then elevated by a suitable conveyor mechanism 19 and discharged at this temperature into hopper 20.

About 80% by volume of the air entering line $a'$ at a temperature of —276° F. flows through heat exchanger 59 in heat exchange relation with nitrogen and enters high pressure section 44 of column 43 at a temperature of about —277° F. and a pressure of about 72 lbs.

About 2% of the air at a temperature of —276° F. is passed through line 77, header 76 and tubes 74 leaving through header 75 at a temperature of 82° F. and entering line 82 where it mixes with the remaining 18% of the air flowing through line 79 and valve 80, the mixture at a temperature of —233° F. entering expander 83. The expanded air at a temperature of —306° F. and a pressure of about 6 lbs. flows through line 84 into the low pressure section 45. The amount of refrigeration thus introduced into the system is adequate to compensate for cold losses resulting from the difference in enthalpy between the incoming air and the outgoing products of rectification and for heat leaks into the system.

Nitrogen at a temperature of about —287° F. and a pressure of 72 lbs. is withdrawn through line 56 and passes through valve 57, its temperature being reduced to about —315° F. as a result of the expansion through the pressure reducing valve 57. Nitrogen at a temperature of —316° F. and a pressure of about 5.5 lbs. is withdrawn through line 64 and flows through line 65 and heat exchanger 49, where its temperature is raised to —303° F. The nitrogen flows from heat exchanger 49 through heat exchanger 52 and mixes with that from line 56; the combined nitrogen stream thus produced at a temperature of —293° F. flows through line 58 into heat exchanger 59 where the temperature of the nitrogen is raised to —288° F. The nitrogen at this temperature and a pressure of about 5 lbs. enters inlet $n$ to exchanger 70. The nitrogen flows upwardly through the downwardly moving bed of pellets in this exchanger and exits through line $n'$ at a temperature of about 88° F.

The temperature and pressure of the nitrogen and oxygen streams introduced as reflux through lines 48 and 53 into the low pressure stage 45 are substantially the same as in Example 1 above.

Oxygen at a temperature of —293° F. flows through line 69, header 72 and tubes 71, exiting through header 73 at a temperature of about 85° F. The thermophore pellets enter exchanger 70 at a temperature of 90° F. and leave through pipe 31 at a temperature of approximately —283° F. at which temperature they are introduced into the air exchanger 12.

The above examples are given for purposes of illustration only. The preferred temperature and pressure conditions may vary within the following ranges: The oxygen may be introduced into the oxygen exchanger at a temperature of from about —280° to about —295° F.; the nitrogen may be introduced into the nitrogen exchanger at a temperature from about —270° to about —290° F. The thermophore pellets may be introduced into these exchangers at a temperature of from about 70° to about 110° F. The pellets may be withdrawn from these exchangers at a temperature close to that of the entering oxygen and nitrogen and the oxygen and nitrogen at a temperature close to that of the entering pellets. The pellets may be introduced into the air exchanger at a temperature of from about —265° to about —285° F. and passed downwardly countercurrent to the air stream introduced at a temperature of from about 70° to about 110° F. The pellets may be withdrawn from the air exchanger at a temperature approaching that of the entering air and at this temperature introduced into the oxygen and nitrogen exchangers or into a common exchanger for both products of rectification, such as exchanger 70 of Fig. 2. The air may be withdrawn from the air exchanger at a temperature approaching that of the entering pellets. In general, it is advisable to cool the air by direct heat exchange with the chilled thermophore pellets to a temperature close to but somewhat above its dewpoint under the pressure conditions prevailing in the air exchanger so that substantially none of the air is liquefied. Operating in this manner substantially all of the carbon dioxide is removed from the air by deposition on the pellets and thus operating difficulties arising from the presence of solid carbon dioxide in the rectification system are avoided.

The pressure conditions within the air exchanger may be maintained at from about 60 to about 100 lbs. The pressure conditions within the nitrogen and oxygen exchangers may be maintained within the range of about 2 to 10 lbs., preferably about 5 lbs.

In Fig. 1. the first zone involves two exchangers 10 and 11 in parallel for effecting cold exchange between the rectification products and the thermophore pellets, and the second zone involves a single exchanger in which cold exchange takes place between the air stream and the chilled thermophore stream. In Fig. 2 each of the zones consists of a single exchanger. It will be understood that each of the two zones may consist of two or more exchangers each containing a bed or mass of thermophore pellets in series or parallel arrangement. Thus, for example, the nitrogen rectification product may be passed through two or more exchangers arranged in parallel or series and the oxygen rectification product likewise passed through such arrangement of exchangers instead of having one exchanger for both as in Fig. 1. Further, while in the drawings the exchangers are shown arranged vertically with the air exchanger below the rectification product exchanger, the relative position of these exchangers may be reversed or the exchangers may be arranged side by side instead of vertically.

It will be noted that in the process of this invention, due to the unusually high surface area provided by the thermophore pellets per unit volume of exchanger space, cold exchange between the nitrogen and/or oxygen products of rectification on the one hand and the thermophore pellets on the other, and between the thermophore pellets and the air takes place more efficiently than in prior known procedures for producing oxygen. Further, the process of this invention may be carried out employing air containing moisture and carbon dioxide, i. e., without subjecting the air to a preliminary purification treatment to effect removal of condensible constituents, by removing from the air exchanger a portion of the thermophore pellets, purging the pellets thus removed to effect removal of condensed constituents therefrom and returning the thus purged pellets to the exchanger system of circulating thermophore pellets. It will be understood that, if desired, the air may be pretreated, say by chemical methods, to remove one condensible constituent and the other or others may be purged by the process of this invention. Such variations are within the purview of the invention.

Since certain changes may be made in carrying out the above process without departing from the scope of the invention, it is intended that all matter contained in the above description shall be interpreted as illustrative and not in a limiting sense.

What is claimed is:

1. The method of producing oxygen by the liquefaction and rectification of air containing carbon dioxide, which comprises passing downwardly a moving permeable heap of thermophore pellets, passing a cold stream of rectification product upwardly through said heap thereby chilling said pellets to a temperature close to that of the incoming rectification product, passing the thus chilled pellets downwardly in a second moving permeable heap, passing a stream of air containing carbon dioxide substantially uniformly distributed throughout said second heap upwardly therethrough thereby imparting the cold removed from the rectification product to the air stream and condensing out of the air stream said carbon dioxide, withdrawing the air from said second heap, withdrawing thermophore pellets containing said carbon dioxide in condensed form from said second heap, and returning the withdrawn thermophore pellets to said second heap after effecting the elimination of said carbon dioxide therefrom.

2. The method of recovering the cold content of a nitrogen product of rectification in the liquefaction of air to produce oxygen, which comprises passing downwardly a moving permeable heap of thermophore pellets, passing a cold stream of nitrogen rectification product up through said heap thereby chilling said pellets to a temperature close to that of the incoming nitrogen rectification product, passing the thus chilled pellets downwardly in a second moving permeable heap, passing a stream of air containing moisture and carbon dioxide up through said second heap thereby depositing the condensed moisture on the thermophore pellets in the lower portion of said second heap and the carbon dioxide on the pellets in the upper portion of said second heap, removing from said second heap a portion of the thermophore pellets containing condensed moisture, separately removing from said second heap a portion of the thermophore pellets containing carbon dioxide, separately treating the portions of thermophore pellets thus removed to effect the elimination therefrom of said moisture and carbon dioxide and separately returning the thus treated portions of thermophore pellets to the respective portions of said second heap from which they were removed.

3. The method of recovering the cold content of a nitrogen product of rectification in the liquefaction of air to produce oxygen, which comprises passing downwardly a moving permeable heap of thermophore pellets, passing a cold stream of nitrogen rectification product up through said heap thereby chilling said pellets to a temperature close to that of the incoming nitrogen rectification product, passing the thus chilled pellets downwardly in a second moving permeable heap and from said second heap downwardly in a third moving permeable heap, passing a stream of air containing moisture and carbon dioxide up through said third heap thereby depositing moisture on the thermophore pellets in said third heap, passing the air from said third heap up through said second heap thereby depositing carbon dioxide on the pellets in said second heap, removing a portion of the pellets containing moisture from said third heap, treating the pellets thus removed to effect elimination therefrom of said moisture, returning the thus treated pellets to said third heap, and removing a portion of the pellets containing the carbon dioxide from said second heap, treating the pellets thus removed to effect the elimination therefrom of said carbon dioxide and returning the thus treated pellets to said second heap.

4. The method as defined in claim 3, in which the air stream in its flow from the third bed to the second bed is refrigerated to introduce thereinto an amount of cold adequate to compensate for cold losses resulting from the difference in enthalpy between the incoming air and the outgoing products of rectification and for heat leaks into the system.

5. The method of recovering the cold content of a nitrogen product of rectification in the liquefaction of air to produce oxygen, which comprises passing downwardly a moving permeable heap of thermophore pellets, passing a cold stream of nitrogen rectification product up through said heap thereby chilling said pellets to a temperature close to that of the incoming nitrogen rectification product, passing the thus chilled pellets downwardly in a second moving permeable heap, passing a stream of air containing moisture up through said second heap thereby condensing moisture on the thermophore pellets in the lower portion of said second heap, causing the moisture thus condensed on the thermophore pellets in said second heap to drain therefrom, and separately removing the pellets and the separated moisture from the base portion of said second heap.

6. The method of recovering the cold content of a nitrogen product of rectification in the liquefaction of air to produce oxygen, which comprises passing downwardly a moving permeable heap of thermophore pellets, passing a cold stream of nitrogen rectification product up through said heap thereby chilling said pellets to a temperature close to that of the incoming nitrogen rectification product, passing the thus chilled pellets downwardly in a second moving permeable heap, passing a stream of air containing moisture and carbon dioxide up through said second heap thereby depositing moisture on the thermophore pellets in the lower portion of said second heap, causing the moisture to drain from the pellets in the lower portion of said second heap, removing the thus drained moisture, removing a portion of the thermophore pellets containing carbon dioxide from the upper portion of said second heap, treating the thermophore pellets thus removed to effect the elimination therefrom of said carbon dioxide and returning the thus treated thermophore pellets to said second heap.

7. The method of recovering the cold content of a nitrogen product of rectification in the liquefaction of air to produce oxygen, which comprises passing downwardly a moving permeable heap of thermophore pellets, passing a cold stream of nitrogen rectification product up through said heap thereby chilling said pellets to a temperature close to that of the incoming nitrogen rectification product, passing the thus chilled pellets downwardly in a second moving permeable heap, passing a stream of air containing a condensible constituent up through said second heap, thereby depositing said condensible constituent on the pellets in said second heap, withdrawing pellets containing the deposited condensible constituent from said second heap and purging said pellets of said deposited condensible constituent, returning the purged pellets to said second heap, withdrawing the air stream from said second heap at a temperature close to that of the nitrogen introduced into the first-mentioned heap, passing the withdrawn air into the high pressure stage of a two-stage rectification system, withdrawing from the high pressure stage a minor portion of the total nitrogen introduced into the process, said nitrogen containing incondensible gases, passing at least part of said minor portion in indirect heat exchange with one of the said heaps to heat said minor portion, expanding the thus heated minor portion, passing the expanded portion in indirect heat exchange relation with the oxygen and nitrogen streams supplied as reflux to the low pressure stage and with the air supplied to the high pressure stage of the rectification system, and then passing said expanded portion through the first-mentioned heap.

8. The method of producing oxygen by the liquefaction and rectification of air containing carbon dioxide, which comprises passing downwardly through one heat exchange zone a heap of thermophore pellets, flowing a cold stream of air rectification product upwardly through said heap of pellets, withdrawing said pellets from the base of said heap at a temperature close to that of the incoming cold stream of air rectification product, passing the withdrawn chilled pellets in a heap downwardly through a second heat exchange zone, flowing a stream of air containing carbon dioxide upwardly through said second heap of pellets thereby depositing said carbon dioxide in condensed form on the pellets in said second heap, withdrawing the air substantially free of said carbon dioxide from the top of said second heap at a temperature close to that of the pellets withdrawn from the base of the first-mentioned heap, withdrawing pellets from the base of said second heap and adding the same to the top of the first-mentioned heap, separately withdrawing pellets having said carbon dioxide in condensed form from said second heap and adding the same to the first-mentioned heap to purge said pellets of said carbon dioxide.

9. The method of recovering the cold content of a nitrogen product of rectification in the liquefaction of air to produce oxygen, which comprises passing a heap of thermophore pellets downwardly through one heat exchange zone, flowing a cold stream of nitrogen rectification product upwardly through said heap of pellets thereby chilling said pellets to a temperature close to that of the incoming cold stream of nitrogen rectification product, passing the thus chilled pellets in a heap downwardly through a second heat exchange zone, flowing a stream of air containing a condensible constituent upwardly through said second heap of pellets thereby imparting the cold removed from the nitrogen rectification product to the air stream and depositing said condensible constituent on said pellets, withdrawing pellets from the base of said second heap and adding the same to the top of the first-mentioned heap, separately withdrawing pellets having said condensible constituent deposited thereon from said second heap and purging said pellets of said condensible constituent, returning the purged pellets to said second heap, withdrawing the thus cooled air from the top of said second heap, warming a minor portion of said cooled air by passage through said second heap in indirect heat exchange relation therewith, and expanding the warmed minor portion of the air to produce refrigeration to compensate for cold losses due to the difference in enthalpy between the incoming air and the outgoing products of rectification and for heat leaks into the system.

10. The method of claim 9 wherein a cold stream of oxygen rectification product is passed upwardly through the first-mentioned heap of pellets in indirect heat exchange relation therewith.

11. A method of separating condensible materials from gases which comprises the steps of passing a gas feed stream containing condensible materials into the lower end portion of a purification zone; cooling solid heat exchange material in a first heat exchange zone; passing said cooled solid heat exchange material into the upper portion of said purification zone and gravitating said material downwardly therethrough; passing said gas feed stream upwardly and countercurrent to said cooled solid heat exchange material, whereby successive condensible materials are condensed in successive portions of said purification zone; withdrawing portions of said cooled solid heat exchange material containing said condensed materials from said successive portions of said purification zone; returning to said purification zone the withdrawn portions of said solid heat exchange material after eliminating said condensed materials therefrom; gravitating said solid heat exchange material from the lower end portion of said purification zone; removing uncondensed gases from the upper end portion of said purification zone; and passing said solid heat exchange material into the upper portion of said first heat exchange zone.

12. A method of separating condensible vapors from gas and separating said gas into its final constituents which comprises the steps of passing a gas into the lower portion of at least one first heat exchange zone; gravitating solid heat exchange material which is at a temperature below that of said gas into the upper portion of each said first heat exchange zone; gravitating said solid heat exchange material downwardly through each said first heat exchange zone as a contiguous mass counter to the flow of said gas through said first heat exchange zone so as to cool said gas, warm said solid material, selectively condense at least one condensible vapor from said gas, which condensed material flows downwardly to the lower end of each said first heat exchange zone with said solid materials; removing said cooler gas from the upper portion of each said first heat exchange zone; passing said gas to a low temperature fractionator zone so as to separate said gas into its final constituents; separating a portion of said condensed material from said solid material at the lower end of each said first heat exchange zone; gravitating said warmed solid heat exchange material from each said first heat exchange zone directly into the upper end portion of a second heat exchange zone respectively communicating with each said first heat exchange zone and downwardly through each said second heat exchange zone as a contiguous mass; injecting cold gas from said fractionator zone into the lower portion of each said second heat exchange zone; passing said cold gas upwardly through said contiguous mass in each said second heat exchange zone so as to cool said solid material, warm said cold gas, and vaporize any portion of said condensed material from each said first heat exchange zone which remains on said solid heat exchange material in each said second heat exchange zone; removing gaseous effluent material from the upper portion of each said second heat exchange zone; removing said cooled solid heat exchange material from the lower portion of each said second heat exchange zone; and elevating said cooled solid heat exchange material from the lower end of each said second zone to the upper portion of each said first heat exchange zone connected thereto.

References Cited in the file of this patent

UNITED STATES PATENTS

| Number | Name | Date |
|---|---|---|
| 1,178,667 | Niewerth | Apr. 11, 1916 |
| 1,871,166 | Fahrbach | Aug. 9, 1932 |
| 2,460,859 | Trumpler | Feb. 8, 1949 |
| 2,537,044 | Garbo | Jan. 9, 1951 |
| 2,560,469 | Ogorzaly | July 10, 1951 |
| 2,561,720 | Alleman | July 24, 1951 |

FOREIGN PATENTS

| Number | Country | Date |
|---|---|---|
| 525,197 | Great Britain | Aug. 23, 1940 |